(12) United States Patent
Anderson et al.

(10) Patent No.: US 7,882,003 B2
(45) Date of Patent: Feb. 1, 2011

(54) SYSTEM AND METHOD FOR REMOTE DEPOSIT CAPTURE

(75) Inventors: Don Anderson, Denville, NJ (US); Ana McDonald, Tampa, FL (US); Cheryl Weitman, New York, NY (US); Jacquelene Savage, Pittsburgh, PA (US)

(73) Assignee: Metropolitan Life Insurance Company, New York, NY (US)

( * ) Notice: Subject to any disclaimer, the term of this patent is extended or adjusted under 35 U.S.C. 154(b) by 0 days.

(21) Appl. No.: 12/757,289

(22) Filed: Apr. 9, 2010

(65) Prior Publication Data

US 2010/0262522 A1 Oct. 14, 2010

Related U.S. Application Data

(63) Continuation of application No. 11/979,471, filed on Nov. 2, 2007, now Pat. No. 7,720,735.

(60) Provisional application No. 60/856,035, filed on Nov. 2, 2006.

(51) Int. Cl.
G06Q 40/00 (2006.01)
(52) U.S. Cl. ...................................... 705/35
(58) Field of Classification Search ................. 235/379, 235/381; 273/256; 283/58; 358/1.18; 353/122; 356/71; 463/25; 705/30–45; 717/106
See application file for complete search history.

(56) References Cited

U.S. PATENT DOCUMENTS

| | | | |
|---|---|---|---|
| 5,910,988 A | 6/1999 | Ballard | |
| 6,032,137 A | 2/2000 | Ballard | |
| 6,629,081 B1 | 9/2003 | Cornelius et al. | |
| 7,181,430 B1 * | 2/2007 | Buchanan et al. | 705/45 |
| 7,428,984 B1 | 9/2008 | Crews et al. | |
| 7,440,924 B2 | 10/2008 | Buchanan et al. | |
| 2002/0052852 A1 | 5/2002 | Bozeman | |
| 2002/0184152 A1 | 12/2002 | Martin | |
| 2004/0111346 A1 | 6/2004 | Macbeath et al. | |
| 2004/0236688 A1 | 11/2004 | Bozeman | |
| 2005/0071283 A1 | 3/2005 | Randle et al. | |
| 2005/0080717 A1 * | 4/2005 | Belyi et al. | 705/38 |
| 2005/0096986 A1 * | 5/2005 | Taylor et al. | 705/16 |
| 2005/0108168 A1 * | 5/2005 | Halpin et al. | 705/45 |
| 2005/0246193 A1 | 11/2005 | Roever et al. | |
| 2006/0020366 A1 | 1/2006 | Bloom | |

(Continued)

FOREIGN PATENT DOCUMENTS

JP 345983 12/2001

OTHER PUBLICATIONS

Check 21 complications? American Bankers Association. ABA Banking Journal v97n1 pp. 53-56, Jan. 2005.*

(Continued)

*Primary Examiner*—Mary Cheung
*Assistant Examiner*—Tien C Nguyen
(74) *Attorney, Agent, or Firm*—Troutman Sanders, LLP

(57) ABSTRACT

A system includes one or more remote check deposit locations, and one or more treasury receipt servers to receive check information captured from the one or more remote check deposit locations, and to receive transaction data from an originating depository financial institution (ODFI), the transaction data including an amount of funds available from clearing the captured check information.

19 Claims, 2 Drawing Sheets

U.S. PATENT DOCUMENTS

| | | | |
|---|---|---|---|
| 2006/0065717 A1* | 3/2006 | Hurwitz et al. | 235/381 |
| 2006/0106717 A1 | 5/2006 | Randle et al. | |
| 2006/0178918 A1 | 8/2006 | Mikurak | |
| 2008/0040280 A1 | 2/2008 | Davis et al. | |

OTHER PUBLICATIONS

Check Images Raise New Cash Management Revenue (Texas Commerce offers account reconciliation based on imaging and CD-ROM technology; banks predicted to generate $5.58 bil in revenue from these types of services by 2000), Bank Technology News, v9, n4, p. 13+, Apr. 1996.*

Check Image Archives Boost Banks' Need for Digital Storage, Optical Memory News, n 241, p. N/A, Jul. 15, 1997.

Check-Scanning ATMs Gaining Ground. (automated teller machines), American Banker, v171, n49, p. 3A, Mar. 14, 2006.

LaSalle Bank Corporate Clients Processing Check Deposits Electronically, PR Newswire, p. NA, Oct. 12, 2005.

"FRB: Frequently Asked Questions about Check 21," [download from Internet on Oct. 11, 2001]; <URL: www.federalreserve.gov/paymentsystems/truncation/faqs2.htm>.

Mientka, Matt, "Check 21 Approaches, Part I," AFP Exchange Magazine, Sep./Oct. 2004 Issue, Oct. 4, 2004 [downloaded from Internet on Oct. 12, 2006]; <URL: www.afponline.org/pub/res/news/ns_20041004_check21.html>.

Mientka, Matt, "Check 21 Approaches, Part II," AFP Exchange Magazine, Sep./Oct. 2004 Issue, Oct. 5, 2004 [downloaded from Internet on Oct. 12, 2006]; <URL: www.afponline.org/pub/res/news/ns_20041005_check21.html>.

Mientka, Matt, "Check 21 Approaches, Part III," AFP Exchange Magazine, Sep./Oct. 2004 Issue, Oct. 6, 2004 [downloaded from Internet on Oct. 12, 2006]; <URL: www.afponline.org/pub/res/news/ns_20041006_check21.html>.

"Business Method Patents in Financial Services: A new toll booth on the Remote Deposit Capture superhighway?" [downloaded from Internet on Oct. 16, 2006]; <URL: remotedepositcapture.com/Insider/patent_issues_050628.htm>.

* cited by examiner

SYSTEM AND METHOD FOR REMOTE DEPOSIT CAPTURE

CROSS-REFERENCE TO RELATED APPLICATIONS

This application is a continuation of U.S. patent application Ser. No. 11,979,471, filed Nov. 2, 2007, which claims benefit, under 35 U.S.C. §119(e), of U.S. Provisional Application Ser. No. 60/856,035, filed Nov. 2, 2006, the entire contents and substance of which are hereby incorporated by reference.

BACKGROUND OF THE INVENTION

Field of the Invention

The present invention relates to a system and method for capturing check deposits, and more particularly to a system and method for portfolio forecasting based on captured deposit information.

SUMMARY OF THE INVENTION

Accordingly, the present invention is directed to a system and method for remote deposit capture that substantially obviates one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the system includes one or more remote check deposit locations, and one or more treasury receipt servers to receive check information captured from the one or more remote check deposit locations, and to receive transaction data from an originating depository financial institution (ODFI), the transaction data including an amount of funds available from clearing the captured check information.

In another aspect, the method includes receiving, via one or more treasury receipt servers, check information captured from one or more remote check deposit locations, and receiving, via the one or more treasury receipt servers, transaction data from an originating depository financial institution (ODFI), the transaction data including an amount of funds available from clearing the captured check information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiments of the present invention, examples of which are illustrated in the accompanying drawings.

System Overview

The remote deposit capture system according to the present invention capitalizes on a federal regulation ("Check 21") that provides financial institutions the ability to accept a legal substitute of a customer's original check when presented for collection. Generally, Check 21 allows financial institutions to receive, deposit and exchange images of checks electronically rather than by moving the original paper checks. In particular, the system and method of the present invention optimizes remote payment receipts providing expanded selection (including but not limited to checks, debit/credit cards) of payment deposits and allows all payments received in a remote location, (including but not limited to, in-house lockbox locations, any location where mail is received, remittance centers and other back office locations, affiliated and independent agency/broker sales offices, and client locations) to be electronically transmitted to the bank and converted into an electronic deposit or ACH debit.

In general, the checks received at a given location, as described above, are processed to accumulate data related to the check via a process, which may include sorting checks by legal entity, bank account, type of product, such as check swipe or other criteria, and scanned (i.e., machine-read) to capture the check image, including check information (MICR line), such as routing number, account number, and check serial number, for example. These images as well as data elements, along with the check amount, are used to create an electronic record of the checks. As determined by business rules, this electronic check image, and/or check information, is then transmitted to the financial institution (e.g., banks) based on decisioning trees established by the business. The financial institution processes the electronic check image, and/or check information, crediting the funds to a bank account, as prescribed within the business rules and decisioning trees, to which the check is made. The system and method of the present invention generally allows the funds made by the checks to be available based on an individual bank's negotiated availability schedules for as early as today and as late as several days.

System Components

Figure 1:
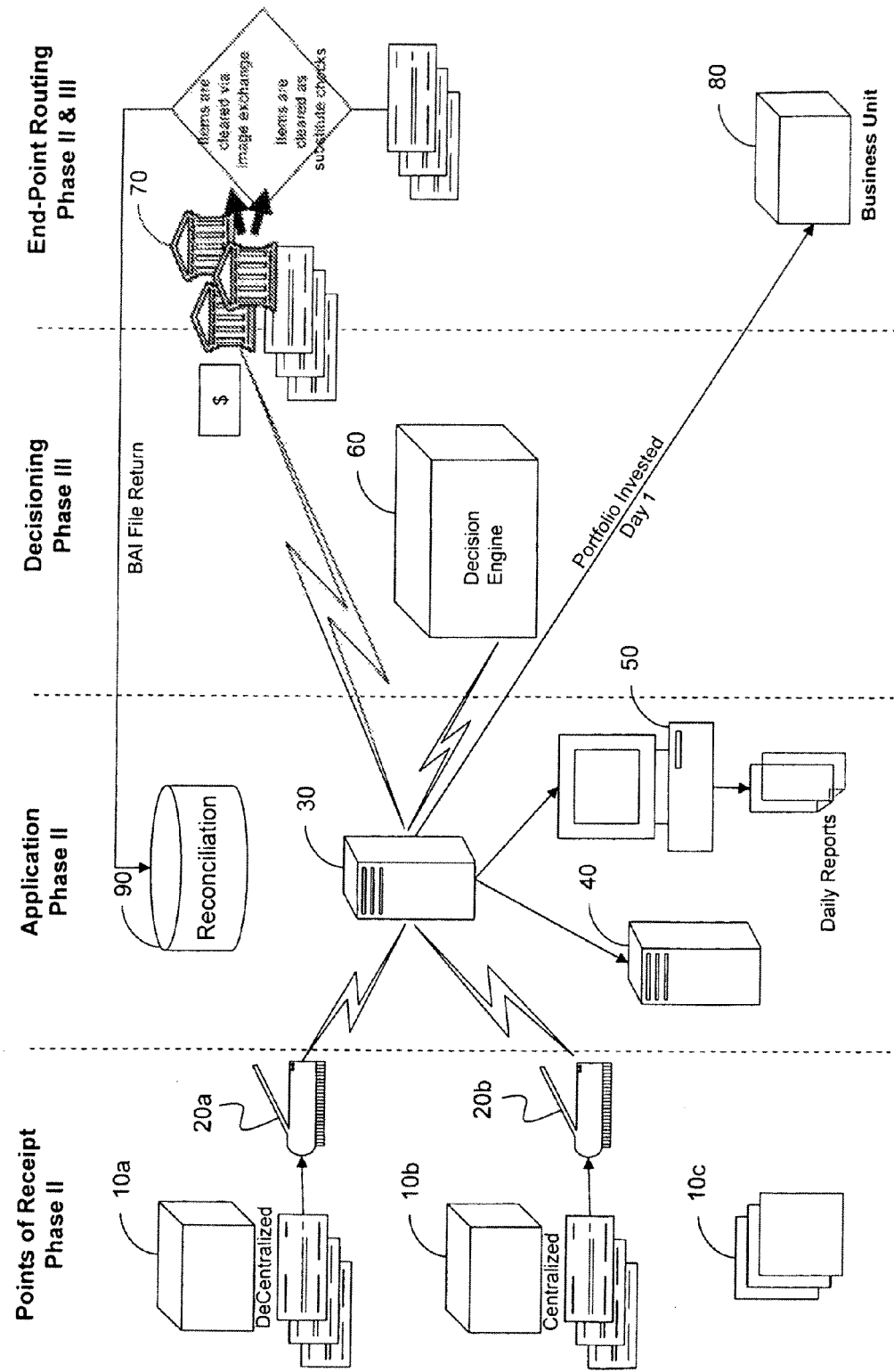
FIG. 1 is a system diagram of an exemplary embodiment of the present invention.

FIG. 1 illustrates an exemplary embodiment of the present invention. The exemplary embodiment of the present invention includes, but is not limited to, a computerized workstation (20a, 20b) at each check entry point (10a, 10b, 10c) where checks are received. The check entry points (10a,10b, 10c) (also referred to as "check receipt" locations) may be affiliated and/or independent agent/broker sales office locations (10a), central back offices (10b), and any other sites (e.g., the client's home) (10c) where checks or electronic payments, debit cards for example, are presented as forms of payment. Each of the computerized workstations (20a,20b) includes a scanning device that reads the checks and other types of electronic payments to creates electronic records related to the payments. The computerized workstations (20a,20b) may be implemented using a general purpose computer, personal digital assistant (PDA), or other specialized computing devices in connection with the scanning device.

Furthermore, specialized all-in-one devices that can scan, digitize, and transmit electronic records of the checks, or other electronic payments, directly to the banks may also be used.

The scanning devices may be general optical scanning devices that create an electronic image of the checks and/or other related documentation related to the payment or the customer making a payment. Alternatively, the scanning devices may be specialized scanning devices, such as a scanner that detects and captures the magnetic ink character recognition information (MIRC) on the checks. Other types of scanning devices and imaging (i.e., workflow) software and hand-held devices may also be used without departing from the scope of the present invention.

The electronic record of the check may include the dollar amount, routing number, account number, and check serial number acquired from the scanned check and may also include the actual electronic image of the check. Additionally, each payment (e.g., check and debit/credit card) scanned or captured into the database may have various keyed attribute information, including, but not limited to, product, portfolio, policy/contract information, sales representative information, financial reporting, general ledger, accounting information, and Line of Business ("LOB"). The electronic record also includes the amount of the check to be processed by the financial institution. The amount entered on the check may be manually entered during processing or may be captured automatically using character recognition technologies. Once the data elements of the check, including an image of the check, are captured, the physical check is returned to the client (if taken at point of sale) and/or is maintained for a prescribed period of time with Standard Destruction Procedures as determined as part of Treasury's control procedures, controls of which may be developed in accordance with governing law and regulatory bodies and operational business changes as deemed necessary. The physical check are not destroyed immediately to allow for exceptions where a physical check is required by the Originating Depository Financial Institution ("ODFI") (in the case of fraud), not sufficient funds ("NSF"), or closed account, for example. As one of the liabilities passed from ODFI to the scanning entity includes ensuring the original check is not presented for payment when an electronic image of the same item has been presented for deposit, a consistent enterprise control is all physical checks will be maintained for and destroyed within a reasonable period of time, as prescribed by Treasury and Legal/Compliance Departments, to meet the business requirements while managing the associated risk.

The electronic records and images of the checks and other payments are then transmitted to a central treasury receipt server/database (30). In the alternative, a distributed server structure including multiple servers may be used without departing from the scope of the present invention. In particular, a distributed server structure may be advantageous for load balancing during peak data traffic times as well as for fail-safe issues and disaster recovery/contingency planning. The treasury receipt server (30) is connected to an archive database (40) for archiving the images of the checks as well as the electronic records of the checks. A treasury receipt station (50) is connected to the treasury receipt server to perform administrative tasks, such as security administration with dual controls, accounting and system maintenance, audit tools, segregation of duties, portfolio, ad hoc, daily, periodic, and exception report generation, portfolio allocation, transmission file and bank reconciliation, and the like. A distributed archival server structure including multiple archival servers (40) may be used without departing from the scope of the present invention. Additionally, hosted, licensed, or other environment for treasury receipt server (30) and the archival server (40) structure may also be used without departing from the scope of the present invention. For example, some or all of the functionality of the treasury receipt server (30) may be hosted by an ODFI.

The treasury receipt server (30) receives the electronic records of the checks and generates a data file and a check image file to be transmitted to the financial institutions (70) for processing as an electronic deposit, or Image Cash Letter ("ICL"). This electronic deposit, or ICL, has various methods of clearing with financial institution. The bank that receives the electronic deposit or ICL is known as an Originating Depository Financial Institution ("ODFI") mentioned above. ODFI's may clear the electronic check images in several ways, including but not limited to (1) as an "On Us" items cleared within the ODFI, (2) image exchange where the ODFI has an arrangement to accept and transmit image exchange with other financial institutions, and (3) Image Replacement Documents ("IRDs"), where a substitute check is printed and cleared through the Federal Reserve. It is the ODFI's responsibility to negotiate the clearing and availability schedule. A separate agreed upon schedule may be required for each ODFI with which the electronic deposits are made via ICL by transmitting electronic check information and/or check image files. Based on a designated schedule, a decision engine (60) on the treasury receipt server (30) routes the generated electronic check information and check images based on stored business rules to the proper financial institutions (70) to be processed for deposit. For example, the electronic checks may be sent once a day, at designated times during the day (e.g., 12:00 p.m. EST and 4:00 p.m. EST), or on other periodic basis (e.g., hourly). The frequency of the electronic check image transmissions may be changed according to the business rules stored in the decision engine (60) on the treasury receipt server (30).

Figure 2:
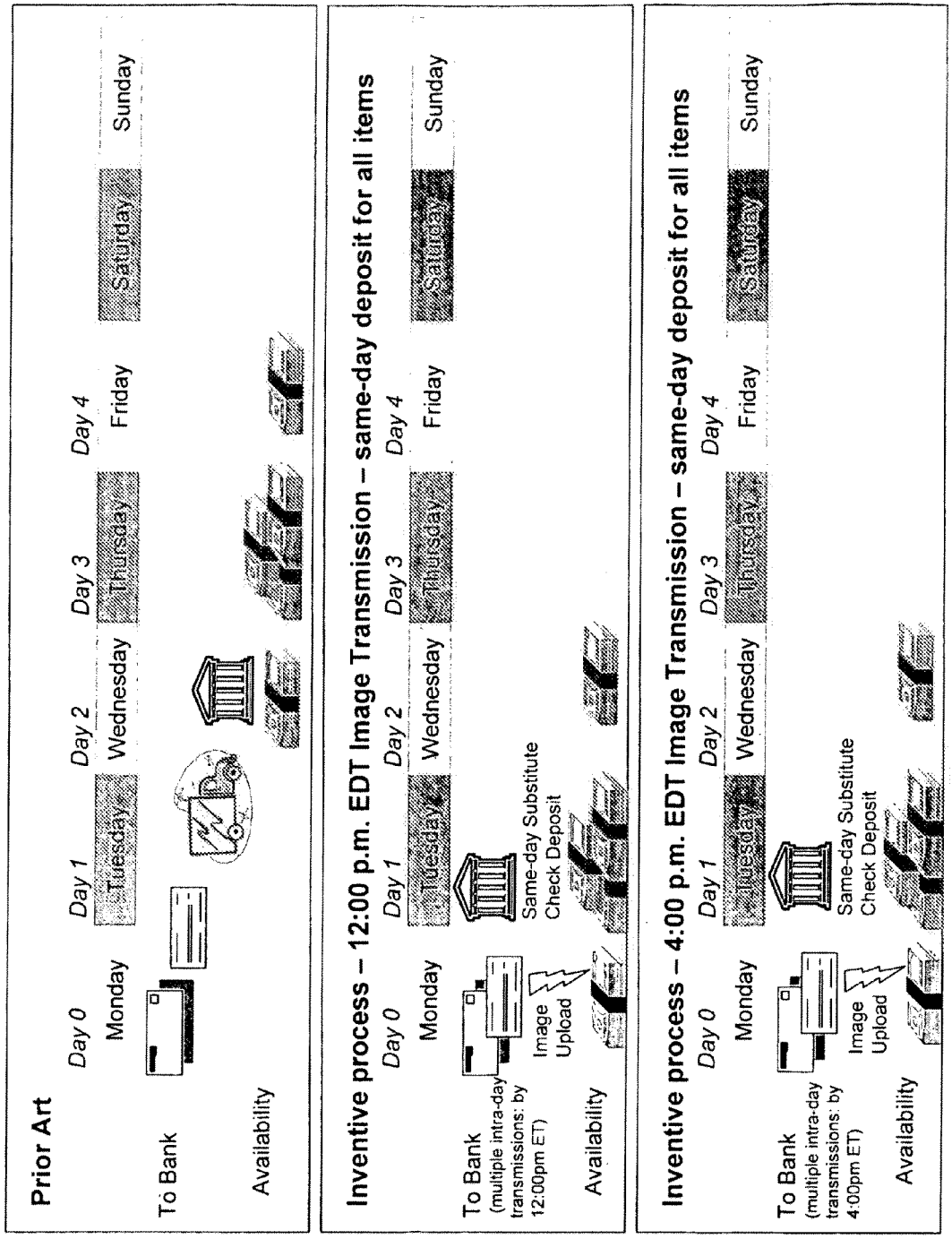
FIG. 2 is an exemplary timing diagram of the progression of a check upon receipt at an entry point to the funds made available.

The treasury receipt server (30) processes the received deposit information and performs cash forecasting of the received deposits. The treasury receipt server (30) then allocates the checks to the appropriate portfolio of invested funds, thereby improving cash forecasting and reducing float time from receipt of a check to portfolio invested funds. As shown in FIG. 2 illustrating an exemplary time line, the system and method of the present invention significantly reduces the delay in availability of the funds from the deposited checks.

The treasury receipts station (50) includes an electronic check "waiting room" to allow the Line of Businesses (LOBs) to identify and apply their own customer's moneys, directs file transmission release to an end point (e.g., to the Federal Reserve, a Financial Institution, or a non-Financial Institution), directs file submission to a batch process for transmission potentially with other file(s), directs file transmissions based on automated timer release or manually transmitted release by an authorized end user(s), directs file submissions with segregation of electronic image to sort batches based on bank availability schedules, and indexes information processed for ease of access (i.e., customer service, returns). The treasury receipt station (5) further includes a decisioning module to be maintained by the Treasury based on current or updated bank availability schedules. The decisioning module processes the release times of files transmitted out of the treasury receipts station (50), maintains confirmation of receipt of transmitted files (i.e., from Financial Institution), produces exception notification and reports to appropriate individuals to monitor, and maintain depositing activities and to correct any items not processed in accordance with treasury business rules.

The remote capturing system and method of the present invention may deposit captured remote checks in a deposit "waiting room" to aggregate those checks received in the check entry points (10*a-c*) (e.g., mail rooms) throughout the operating locations and to allow "read only" access for various departments to visit the "waiting room" and claim the checks (e.g., checks that are intended for a remote location and were erroneously sent to the wrong or generic company address). For instance, as described above, the checks and other forms of payments are captured and collected into the treasury receipt server (30). When the captured deposits are run against stored business rules by the decision engine (60), some of the captured deposits may be flagged as requiring authorization or further attention from an authorized personnel in a designated department These captured deposits are placed into a "waiting room" to await further action. Accordingly, the treasury receipt server (30) may communicate notifications (e.g., email or instant messaging alerts) to the appropriate party as stored in the business rules. The notification message informs the recipient that captured deposits are awaiting further action in the deposit waiting room. Alternatively, periodic reminder notifications may also be used to remind the designated personnel to visit the deposit waiting room at a predetermined time or time interval without departing from the scope of the present invention.

The notifications may contain hyperlinks to a portal or website, for example, that allows the user to access the deposit waiting room. Alternatively, the user may access the deposit waiting room via a specialized application or other points of access without departing from the scope of the present invention. The deposit waiting room may be hosted directly on the treasury receipt server (30) or may be hosted on a different server with access to the captured deposits (i.e., distributed server architecture). The user may be authenticated via login/password, encryption key, digital certificate, and the like. Other authentication processes may be used without departing from the scope of the invention. Once given access, the user may browse through the captured deposits to "claim" them. For instance, the user may change depositing/routing rules such as account, ODFI, and scheduled transmission designations as well as other information. All of the changes/actions may be checked by the decision engine (60) against the business rules to determine whether the actions requested by the users are valid to ensure security.

System Access and Controls

In accordance with an exemplary embodiment of the present invention, front end controls are established by associating users with user IDs that allow access only to predefined bank accounts within the enterprise. The rights to these bank accounts may be established by dual controlled Master ID personnel, segregated in the Corporate Treasury Security Administration group, or the like, to promote safeguarding of assets. For increased security, user ID's may be assigned by the business units only to those individuals current with responsibilities for bank deposit activities. In addition, any changes to responsibility may require the business units to provide a written request, e.g., via email application, to adjust user IDs access rights within the system as well as a bank account(s) which the user may be able to make an electronic deposit, or the like. Some user IDs may have read only, scan only (as in mail room personnel), and/or approver only access to match each individual's end user's responsibilities, reducing the risk of funds being deposited into the wrong bank account, or unauthorized viewing of check images or live checks. Each deposit may include a time and date stamp, and show the user ID of the action performed (i.e., scanning user id differs from approving user ID). In addition, segregation of duties established in the system controls shows those Master IDs who made any additions, changes, or deletions to the user IDs abilities.

Controls for the bank account deposits exist in the Security Administration profile, defining access to bank accounts based on individuals' areas of responsibility. These predefined bank accounts by a user may also include a second approval requirement prior to release of transmission to the ODFI. This second approval may be restricted access to specified bank accounts in the approver's area of responsibility. Once items in a controlled environment have met the detailed requirements to become a qualified file ready for transmission (i.e., having legal entity, LOB, product, portfolio, accounting, sales representative details, and the like), the file will run against a periodically updated decision tree that will reallocate the various electronic check image payments to create segregated transmission files to ODFI's to deposit ICL's in financial institutions based on criteria such as branch location, time zone, "on-us" deposit benefits, most effective funds availability, and the like.

Types of Collection

At the various collection locations (10*a*, 10*b*, 10*c*), one or more methods of collection are initiated, such that, checks are converted into electronic data, processed via either general scanning equipment or scanners specifically designed for scanning checks and/or obtaining the required check depositing information as described above. Check images may be maintained as images or as data, and may require normalization (e.g., format adjustments) to meet specifications as required by the Federal Reserve Bank, a regulatory body, such as NACHA, and/or financial institution(s) which may receive an electronic check image or electronic deposit information, and ACH information.

Locations of Collection

Locations of collection (10*a*, 10*b*, 10*c*) includes, but is not limited to, the back office, agency office, affiliated Bank (both walk in and mail received), and the mailroom. Some mailroom locations may have selected mailroom personnel who have the ability to scan checks into the treasury receipts station to include these check images in the "waiting room" described above. That is, they are entered into a holding area to determine which bank account the funds should be deposited. Based on restricted system access as described above, the mailroom personnel may be prevented from having access to deposit any funds in any free form or predetermined bank account(s). Other users of the system, with access to bank accounts in accordance with their responsibilities, throughout the various Lines of Business, with their system access, may review these mailroom scanned items, and determine if based on the image of the check, and any other unique or defining information, such as policy number, customer name, customer address, bank account number, to determine the appropriate Line of Business, product and customer information to properly deposit the funds. Once determined, the system may track all user IDs that have viewed, as well as claimed the funds. The electronic check image or electronic deposit information may be allocated to a specified bank account awaiting approval to be included in the electronic deposit transmission files. Claimed funds can be deposited separately or within other batches of files to be sent to a financial institution for deposit.

Information to be Collected

The information collected by the exemplary embodiment of the present invention includes, but are not limited to, electronic images of checks that meet image quality standards, as required, and any other imaged information to be added to the process to support customer service or receipts processing, electronic data from a check, including MICR line information (e.g., ABA routing number, bank account information, amount of check, and the like), customer name, if any, policy/contract number, if any, and information that is scanned and or keyed into the treasury receipts station (50).

Application of Collected Information

The information collected are used to automate the back end processing, including but not limited to, electronic sorting of mail based on keyed policy/contract number rules, sorting and batching for work by functional department responsibilities, controlling documents electronic archiving, determining new policy, and existing policy. The collected information allows for automation of feeding various systems, including but not limited, to, accounts receivable, general ledger, archival, customer service and call center support, administrative and sub ledger, bank reconciliation automation. The collected information is used to determine treasury best availability for check clearing, Accounts Receivable Conversion ("ARC") eligibility and clearing, "On-Us" check clearing, affiliated bank check clearing, Image Check Letters ("ICL"), and Image Replacement Documents ("IRD"). The collected information may be applied to a look up table or a portfolio database to apply product and/or portfolio information, and automate the derived portfolio information to feed cash management and investments department activities, including but not limited to, Treasury Work Station ("TWS"), Cash Decision Worksheet ("CDW"), Liquidity Work Sheet ("LWS"), and any other determined locations.

Reporting and Reconciliation

The treasury receipts station (50) includes reporting interfaces that allow the respective general ledger to receive information to record the deposit information in the appropriate accounts by bank and legal entity. Reconciliation for bank accounts are automated via interface (90) between bank account information and general ledger information to receive information to record the deposit information in the appropriate accounts by bank and legal entity.

Treasury Business Rules

Similarly to the banks rules for depositing checks, the present invention includes rules to determine which bank a check should be deposited and by what method it should be cleared through the banking system. Such determination may be based on many criteria, some of which may be based on "all in" pricing of clearing the instrument when clearing options are available, the quickest availability value, the ARC v. check cost comparison, and other bank decisioning rules.

The term "E-routing" is referred to as electronically routing electronic check images to maximize the availability of funds within the negotiated availability schedules, which may vary from time to time. Consideration will be made to possibly include ODFI's that are party to the 2 groups of "Image Exchange" partnerships, SVPCO and ViewPoint Exchange. Controls may be established to ensure that full and false inclusion testing exceptions are identified for each and every transmission file. Notification will be communicated to the respective personnel within each of the business units to timely and effectively repair and/or remedy any transmission file issues that may arise. Cutoff times will be determined as needed and detailed in the business rules and decisioning tree based on need, benefit, the ODFI's ability to accept multiple transmission files, among others. Processes are developed for NSF, closed bank accounts, and other such return items, in conjunction with the Standard Destruction Procedures, to provide the ODFI with the original document via the existing dual controlled, segregation of duties, physically secured check storage area.

Each ODFI may have a bi-lateral agreement ("Agreement"). With multiple ODFI's, each may have its own Agreement with the enterprise for use by any and all current and future 100% owned subsidiaries, for example. Within the Agreements, items may be addressed for such things as Availability Schedules and Liability, including but not limited to shifting of risk associated with checks being collected and scanned by a non-ODFI, for failed transmission files, contingency planning, if any, among others.

The various ODFIs (70) receive the electronic check image files and processed the credit of funds indicated on the electronic checks to the proper accounts as defined in our Security Administration, business rules and decisioning tree. In situations where the ODFIs (70) require a physical check, the original checks are obtained and provided for presentment. The physical checks are then cleared to make the funds available. The transaction data from the financial institutions (70) are then received and stored in a reconciliation database (90). Information is included to allow for accounts receivable ("A/R"), for example, as well as Bank reconciliations with the ICL files in each transmission. Further, bank deposit totals are matched to accounting records for the general ledger financial reporting and A/R systems. The treasury receipt server compares the transaction data received from the ODFIs (70) with the electronic records of the check image files transmitted to the ODFIs (70) stored on the archive database (40) to reconcile the deposits made to the ODFIs (70).

Using an investment company as an exemplary embodiment, the treasury receipt server (30) may then allocate the funds made available by the financial institutions (70) to the appropriate investment portfolios in an investment system (80) within only one or two business days, rather than weeks. All funds deposited are invested based on the underlying transactions, collected and transmitted by portfolio attribution, as keyed or determined by business rules or any other method. System feeds for the summary information of the daily transactions is automatically fed to the various cash management tools, including but not limited to Treasury Work Station ("TWS"), Liquidity Work Station ("LWS"), and Cash Decision Worksheet ("CDW"), allowing for next day investment of the available funds in the appropriate portfolio.

The system and method of remote capture deposit capture in accordance with the present invention improves upon the prior art by:

Allowing utilization of new technologies, products, and services offered by banks;

Allowing for negotiation of better availability schedules with our bank partners and the ability to divert deposits from one bank to another at will;

Accelerating US dollar check float and funds available across the global enterprise;

Enabling process implementation globally via internet and computerized workstation and scanner, expediting the deposit of US dollar checks drawn on US Banks from remote locations throughout the world;

Improving attribution identification of collections by portfolio to invest more effectively;

Increasing cut-off times for working incoming mail, thereby increasing daily funds deposits;

Allowing conversion of all corporate and consumer check payments to electronic check images at remote location, thereby reducing transportation costs and risks of delivery errors;

Reducing float time from receipt of a check to portfolio invested funds;

Improving forward presentment earnings by decreasing mail time;

Improving cash forecasting;

Reducing/eliminating costs and errors associated with paper handling;

Enabling automation of accounts receivable subledger postings ("Admin System updates");

Enabling automation of sales representative information for commission revenue calculations; and Providing competitive advantage at point of sale through increased fund receipt/capture opportunities.

It will be apparent to those skilled in the art that various modifications and variations can be made in the system and method of the present invention without departing from the spirit or scope of the invention. Thus, it is intended that the present invention cover the modifications and variations of this invention provided they come within the scope of the appended claims and their equivalents.

What is claimed is:

1. A computer system, comprising:
    a communication support system linked to a multi-node network wherein plural nodes within the linked network include remote capture workstations, said workstations programmed to scan checks and transmit a digital file comprising information regarding said scanned checks, including an amount of said check; and
    a treasury receipt server, connected to said communication support system and programmed to collect and store transmitted digital check files and further to process said check files;
    wherein said processing of said check files comprises cash forecasting in order to reduce the delay in availability of the funds associated with said check files to an investment portfolio or account.

2. The system of claim 1, wherein one or more said check files are used to feed cash management or investment activities.

3. The system of claim 1, wherein said processing further comprises feeding cash management or investment activities based on allocations of the funds associated with said check files, to one or more cash management or investment accounts.

4. The system of claim 3, wherein the allocation of said funds associated with said check files includes only the funds of the check files that are forecasted to become available.

5. The system of claim 4, wherein the allocations are based on predetermined ratios.

6. The system of claim 4, wherein the allocations are based on the balance ratios of the accounts to be fed.

7. The system of claim 4, wherein said funds of the check files that are forecasted to become available are transferred to said cash management or investment accounts, based on said allocations, immediately or soon after said forecasted funds become available.

8. The system of claim 1, wherein one or more of said check files are transmitted to a system used for one or more of the following: accounts receivable, general ledger, archival, customer service, call center support, administrative ledger, and bank reconciliation.

9. The system of claim 1, wherein one or more of said check files are used to determine treasury best availability for check clearing.

10. A method, comprising:
    transmitting, via a communication support system linked to a multi-node network, one or more digital check files captured from one or more remote capture workstations, said workstations programmed to scan checks and transmit said digital check file comprising information regarding said scanned checks, including an amount;
    receiving, via one or more treasury receipt servers connected to said communication support system, one or more said check files;
    storing, via said one or more treasury receipt servers, said one or more check files; and
    processing, via said one or more treasury receipt server, said one or more said check files, said processing comprising cash forecasting in order to reduce the delay in availability of the funds associated with said check files to an investment portfolio or account.

11. The method of claim 10, wherein said processing further comprises allocating the funds associated with said check files to one or more cash management or investment accounts.

12. The method of claim 10, further comprising feeding one or more of said check files into cash management or investment activities.

13. The method of claim 11, wherein said processing further comprises feeding cash management or investment activities based on said allocations to one or more cash management or investment accounts.

14. The method of claim 13, wherein the allocation of said funds associated with said check files includes only the funds of the check files that are forecasted to become available.

15. The method of claim 14, wherein the allocations are based on predetermined ratios.

16. The method of claim 14, wherein the allocations are based on the balance ratios of the accounts to be fed.

17. The method of claim 14, further comprising transferring said funds of the check files that are forecasted to become available to said cash management or investment accounts, based on said allocations, immediately or soon after said forecasted funds become available.

18. The method of claim 10, further comprising transmitting one or more of said check files to a system used for one or more of the following: accounts receivable, general ledger, archival, customer service, call center support, administrative ledger, and bank reconciliation.

19. The method of claim 10, further comprising determining treasury best availability for check clearing, based on one or more said check files.

* * * * *